(No Model.)

D. B. COMLY.
Spur.

No. 242,113.                    Patented May 31, 1881.

Witnesses:
Perry B. Turpin.
M. M. Lacey

Inventor
David B. Comly
By R. S. & A. P. Lacey
Attys.

UNITED STATES PATENT OFFICE.

DAVID B. COMLY, OF ADENA, OHIO.

SPUR.

SPECIFICATION forming part of Letters Patent No. 242,113, dated May 31, 1881.

Application filed January 19, 1881. (No model.)

*To all whom it may concern:*

Be it known that I, DAVID B. COMLY, a citizen of the United States, residing at Adena, in the county of Jefferson and State of Ohio, have invented certain new and useful Improvements in Spurs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a spur which shall possess the efficiency and be free from the many objections which obtain against ordinary devices of its class.

Figure 1:
Figure 2:
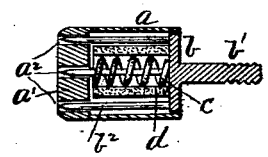
Figure 3:
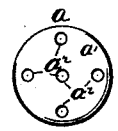
Figure 4:
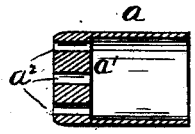
Figure 5:
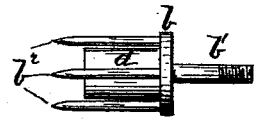

In the drawings, Figure 1 is a side elevation; Fig. 2, a longitudinal section; Fig. 3, an end view; Fig. 4, a detail of the shell or casing, and Fig. 5 a view of the plunger.

$a$ is the shell or casing, which has its outer end closed by a thick plate, $a'$, and has its inner end open. The end plate, $a'$, is perforated by a series of holes, $a^2$, through which are put the pins of the plunger, hereinafter described.

$b$ is the plunger, which is a disk made to fit snugly and slide in the open end of the casing or shell $a$. It is provided with a shaft or pin, $b'$, on its outer side, by which it can be secured to any of the ordinary devices by which spurs are held to the boot-heel; or it may be made so that it can be screwed into the said heel. The plunger is prevented from falling out by means of small lips or flanges formed on the outer end of the casing after the plunger has been placed therein.

On the inner side of the plunger there are fixed a series of prongs, $b^2$, corresponding in number and arrangement to the openings $a^2$ in the head-plate $a'$. I have shown five prongs, one of which is placed at the center of the plunger, and the other four are arranged near the outer edges of said plunger and equidistant apart and from the center prong. This arrangement gives better results, as it insures a steady and regular movement of the plunger without friction. The prongs fit snugly into and close the inner ends of the holes $a^2$ and prevent dirt or other obstructing substances from getting into the casing. The outer ends of the prongs are tapered to sharp points, and when the plunger is against the retaining-lips formed in the open end of the casing these points will be flush with or slightly within the outer face of the end plate, $a'$, as shown. Within the casing, and between the plunger and the head-plate, I place a spiral spring, $c$, which is incased in a hollow cylindrical gum casing, $d$. The gum cylinder $d$ has the double function of being a spring and a shield to protect the metallic spring $c$. When I employ a central prong, $b^2$, it passes through the springs, as shown; but if no central prong be used the two springs will be held in place by the pressure between the plunger and head-plate and by the surrounding pins or prongs. The ends of the shield $d$ fit snugly against the plunger and head-plate and prevent dampness from reaching the inner spring, $c$, except such as may gain admission to the casing through the central hole in the said head-plate.

Should mud or other obstructing substances get into the outer ends of the holes $a^2$ and around the points of the prongs, the use of the spur in such manner as to cause the prongs to be thrust out will eject the mud or other substance.

This device is always in perfect working order, is entirely free from injury by mud or other substances, and is so arranged that the degree of severity with which it is used is entirely under the control of the rider.

The operation will be clear by reference to the drawings. The casing, when brought against the side of the horse, slides back on the plunger, so as to cause the prongs to project beyond the face of the head-plate. When the pressure is removed from the plunger the casing moves outward and the prongs are drawn inside.

Having thus described my invention, what I claim, and desire to secure by Letters Patent, is—

In a spur, the combination of a casing having one end open and the other end closed and perforated with a series of holes, a plunger placed and fitting snugly in the open end of the casing and having on its inner side a series of pointed probes the ends of which enter and snugly fit the openings in the closed ends of the casing, and on its outer side a stem or shaft by which it is fixed to the heel of the boot and supported by a spring placed between it and the closed ends of the casing, the disk and casing being held together so that the latter will be forced back by a blow and project the points outward, substantially as set forth.

In testimony whereof I affix my signature in presence of two witnesses.

DAVID B. COMLY.

Witnesses:
WALTER G. SHOTWELL,
GEORGE F. HUNTER.